(12) United States Patent
Roffman et al.

(10) Patent No.: US 9,028,063 B2
(45) Date of Patent: May 12, 2015

(54) TRANSLATING PRESBYOPIC CONTACT LENS PAIR

(75) Inventors: Jeffrey H. Roffman, Saint Johns, FL (US); Edgar Menezes, Jacksonville, FL (US); Khaled A. Chehab, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 73 days.

(21) Appl. No.: 13/218,627

(22) Filed: Aug. 26, 2011

(65) Prior Publication Data

US 2013/0050637 A1 Feb. 28, 2013

(51) Int. Cl.
*G02C 7/00* (2006.01)
*G02C 7/04* (2006.01)

(52) U.S. Cl.
CPC ............ *G02C 7/043* (2013.01); *G02C 7/045* (2013.01)

(58) Field of Classification Search
CPC .......... G02C 7/04; G02C 7/041; G02C 7/043
USPC ....................... 351/159.02, 159.05–159.14
See application file for complete search history.

(56) References Cited

U.S. PATENT DOCUMENTS

| | | | |
|---|---|---|---|
| 4,549,794 A | 10/1985 | Loshaek et al. | |
| 5,057,578 A | 10/1991 | Spinelli | |
| 5,314,960 A | 5/1994 | Spinelli et al. | |
| 5,371,147 A | 12/1994 | Spinelli et al. | |
| 5,485,228 A | 1/1996 | Roffman et al. | |
| 6,802,606 B2 | 10/2004 | Roffman et al. | |
| 6,883,916 B2 * | 4/2005 | Menezes | 351/159.06 |
| 6,921,168 B2 * | 7/2005 | Lindacher et al. | 351/159.1 |
| 7,004,585 B2 | 2/2006 | Lindacher | |
| 7,040,757 B2 | 5/2006 | Hall et al. | |
| 7,052,132 B2 | 5/2006 | Ezekiel | |
| 7,216,978 B2 | 5/2007 | Perez et al. | |
| 7,430,930 B2 | 10/2008 | Zeller et al. | |
| 7,543,935 B2 | 6/2009 | Ezekiel | |
| 7,976,156 B2 * | 7/2011 | Goto et al. | 351/159.06 |
| 2002/0021410 A1 | 2/2002 | Ye et al. | |
| 2004/0218141 A1 | 11/2004 | Ye et al. | |
| 2010/0171924 A1 | 7/2010 | Perrin | |

FOREIGN PATENT DOCUMENTS

| | | |
|---|---|---|
| EP | 0942312 B1 | 9/1999 |
| EP | 2239617 A1 | 10/2010 |
| WO | WO 2004/072710 A2 | 8/2004 |

OTHER PUBLICATIONS

International Search Report for corresponding Application No. PCT/US2012/050704 Mailed Nov. 5, 2012.

\* cited by examiner

*Primary Examiner* — Ricky Mack
*Assistant Examiner* — Robert E Tallman
(74) *Attorney, Agent, or Firm* — Carl J. Evens

(57) ABSTRACT

Translating, multifocal contact lens pairs with optical power zones which are dissimilar between the first and second lenses of the pair are utilized for correcting presbyopia in the wearer. Each lens may differ in segment height, power, asphericity, shape, orientation and/or inset of the optical power subzones thereby providing clear and comfortable vision at far, intermediate and near distances.

21 Claims, 6 Drawing Sheets

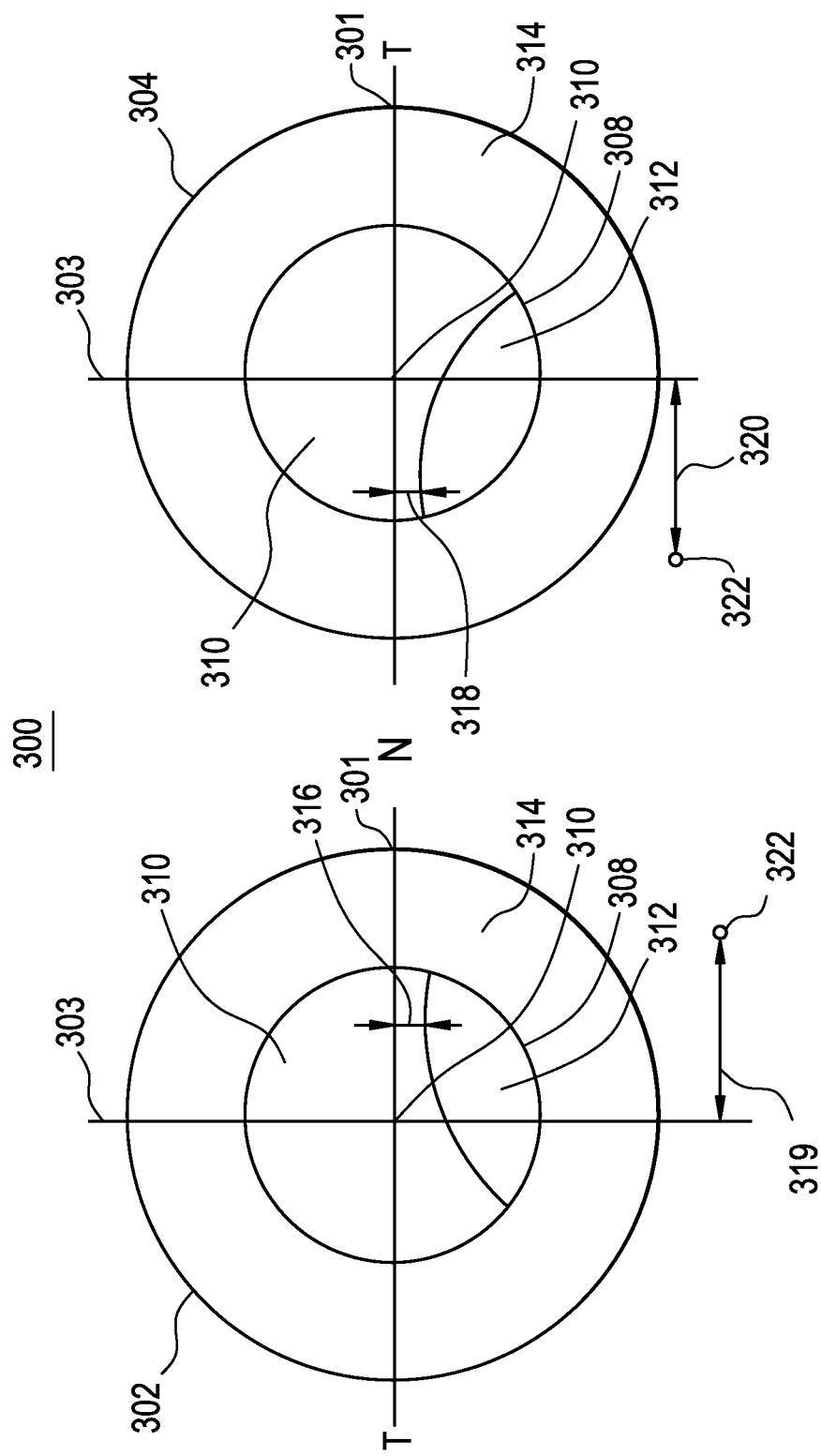

TRANSLATING PRESBYOPIC CONTACT LENS PAIR

BACKGROUND OF THE INVENTION

1. Field of the Invention

The present invention relates to a translating contact lens pair comprising optical power zone features that are different in each lens of the pair, and more particularly to a translating contact lens pair comprising optical power zone features which are different in segment height, power, asphericity, shape, orientation and/or inset of the first lens intended for the first eye as compared to segment height, power, asphericity shape, orientation, or inset of the second lens intended for the second eye.

2. Discussion of the Related Art

In a newborn, the crystalline lens of the eye is somewhat soft and pliant making it extremely flexible and capable of a large degree of accommodation or focusing. As a person ages, the crystalline lens gradually becomes more rigid, and thus, their eyes are less able to accommodate, or bend the natural lens, to focus on objects that are relatively near to the observer. This condition is known as presbyopia.

A plus power lens may be utilized to restore the focusing power lost by the crystalline lens. The plus power lens may take the form of reading glasses, bifocal glasses or trifocal glasses. Reading glasses are easily utilized when an individual does not need refractive correction for distance. However, distant objects will be blurry when looking through reading glasses. If an individual is already wearing glasses for myopia, hyperopia and/or astigmatism, then the plus power may be added to the existing glasses in the form of a bifocal or trifocal lens. Contact lenses may also be worn to address presbyopia. In one type of such lenses, distance and near vision regions are concentrically arranged around the geometric center of the lens. Light passing though the optical zone of the lens is concentrated and focused at more than one point in the eye. These lenses are generally used in simultaneous vision mode. In simultaneous vision, portions of the lens optical zone focused for distance and near are available at the same time, focusing light from both object distances simultaneously. This is disadvantageous as image quality and image contrast may be degraded.

In another type of contact lens; namely, a segmented lens, near and distance vision regions are not concentric about the geometric center of the lens. The wearer of the segmented lenses is able to access the near vision region of the lens because the lens is constructed to allow it to translate, or move vertically relative to the pupil of the wearer's eye. This translating lens moves vertically when the person wearing the lens shifts their gaze downwardly, for example, to read. This upwardly positions the near vision portion in the center of the wearer's gaze. Substantially all of the light passing though the optical zone may be focused at a single point in the eye based on gaze.

One type of translating lens has a truncated shape. That is, unlike most lenses that are substantially continuously circular or oval, the lower portion of the truncated contact lens if flattened by cutting off or shortening that part of the lens. This results in a substantially flat, thick edge at the bottom of the lens. Exemplary descriptions of such lenses are set forth in a number of patents, including U.S. Pat. No. 7,543,935, U.S. Pat. No. 7,430,930, U.S. Pat. No. 7,052,132, and U.S. Pat. No. 4,549,794. However, a relatively flat edge on contact lenses such as these may tend to reduce comfort. It is therefore desirable to have a translating contact lens without this type of edge design thereby providing improved comfort.

Another type of translating lens has an outer shape which is continuously circular or oval, but comprises a substantially thickened portion peripheral to the central optical zone. This thickened portion is intended to contact the lower lid and positionally translate when the wearer looks down. Exemplary references to such a lens are described in U.S. Pat. No. 7,040,757 and US Patent Publication No. 2010/0171924. In the exemplary embodiment set forth therein, the thickness in the peripheral portions of the lens outside the optical zone is substantially uniform for meridians parallel to the vertical meridian of the lens and which exhibits mirror symmetry with respect to a plane cutting though the vertical meridian.

U.S. Pat. No. 7,216,978 illustrates that the upper and lower eyelids do not move strictly in a vertical direction, with an up and down stroke during blinking. The upper lid moves substantially vertically, with a small nasal component during blinking, and the lower lid moves substantially horizontally, moving nasalward during blinking. Additionally, the upper and lower eyelids are not symmetrical with respect to a plane cutting though the vertical meridian. In other words, individuals do not blink symmetrically relative to a horizontal axis drawn between the open upper and lower lid. In addition, it is known that the eyes converge when the viewer gazes down to read. Accordingly, blinking in of itself may not result in the ideal translation of the contact lens.

In U.S. Pat. No. 6,802,606 and U.S. Pat. No. 5,485,228, binocular pairs are described as part of a simultaneous vision design. These examples illustrate concentric optical design with either a central disc having distance or full near power. This design would not perform as well as part of a translating lens. Essentially, these examples show rotationally symmetric designs which are intended to stay centered over the pupil to provide the optimal power ratio between distance and near. Accordingly, if these designs were translated, the power ratio between the distance and near segments would not be optimized.

It is important to note however that while contact lenses with asymmetric optical zones are known, they are equally asymmetric in each eye and thus the full benefit may not be achieved.

In U.S. Pat. No. 7,004,585, the distance and near centers of a translating lens both lie on the vertical bisector of the optical zone. Once again, the potential disadvantage associated with this type of design is symmetry in the lens as well as between the eyes.

Accordingly, it would be advantageous to have a contact lens pair that provides improved visual acuity at far, intermediate and near distances with reduced or minimal translation requirement, and which provides improved wearing comfort.

SUMMARY OF THE INVENTION

The translating presbyopic contact lens pair of the present invention overcomes a number of the disadvantages associated with current corrective contact lenses for treating presbyopia.

In accordance with one aspect, the present invention is directed to a translating contact pair lens for treating presbyopia. The translating contact lens pair comprising a first contact lens including an optical zone, a peripheral zone and an edge zone and having a first set of optical zone features with a first set of values for the features, and a second contact lens including an optical zone, a peripheral zone and an edge zone and having a second set of optical zone features with a second set of values for the features, wherein a value of at least one feature in the first set of optical power zone features is different than the value of that feature in the second set of optical power zone features and wherein the optical zone of each contact lens is asymmetric about the vertical meridian of the contact lens.

The present invention provides methods for correcting presbyopia, contact lenses for such correction, and methods for producing such contact lenses. The contact lenses of the present invention are translating, multifocal contact lens pairs comprising optical power zone features which are different in the first lens intended for the first eye as compared to optical power zone features of the second lens intended for the second eye. The optical power zones of the first and second lens of the pair may differ in segment height, power, asphericity, shape, orientation, inset, and/or any combinations thereof. The outer circumference of each lens of the translating lens pair may be substantially circular or smooth and continuous, flat and truncated, or it may be asymmetric. The contact lenses of the present invention comprise three main zones; namely, an optical zone, a peripheral zone located radially outwards from the optical zone with features which enable the lens to translate, and an edge zone located radially outwards from the peripheral zone and encompassing the lens edge.

The translating presbyopic contact lens pair of the present invention provides a clear and comfortable fit, with improved image quality and contrast over existing lenses.

As described above, it is generally recognized that the correction of presbyopia with contact lenses is often accomplished with non-translating lenses which subdivide the pupil into zones corrected either for distance or near, in a method known as simultaneous vision. In these designs, the ratio of the distance and near zones is usually around 50:50. As an alternate design mode, translating lenses preferably provide one hundred (100) percent of the desired power at the appropriate time. In practice, however, due to all of the above mentioned factors, the actual ratios are typically about 75:25.

In addition, most wearers today need to function at two different near vision distances. First, when reading printed materials, a wearer will conveniently hold the material at about between thirty-three (33) to about forty-five (45) cm., while computer video display screens are more often between about fifty (50) to about sixty-five (65) cm. This represents a significant difference in accommodative demand. The reading material requires about 2.50 Diopters of accommodation while the more intermediate computer displays require about 1.75 Diopters.

Using either a simultaneous vision design, or a conventional translating approach, it is difficult or impossible to get the proper correction for the distance, computer display, and printed matter when needed. In general, it is required that the wearer look down further when viewing printed reading material than when viewing a computer display.

Additionally, the above designs do not take into account the fact that there is asymmetry in the blink between the upper and lower eyelids, and also the convergence of the eyes during any viewing activity that is not distance related. One of the advantages of the present design is that the required powers are present and in the required position when the wearer needs them.

BRIEF DESCRIPTION OF THE DRAWINGS

The foregoing and other features and advantages of the invention will be apparent from the following, more particular description of preferred embodiments of the invention, as illustrated in the accompanying drawings.

FIG. 3 is a diagrammatic plan view of yet another exemplary embodiment of a translating presbyopic contact lens pair having a third set of optical power zone features that are different in each lens of the pair in accordance with the present invention.

DETAILED DESCRIPTION OF THE PREFERRED EMBODIMENTS

Figure 1:
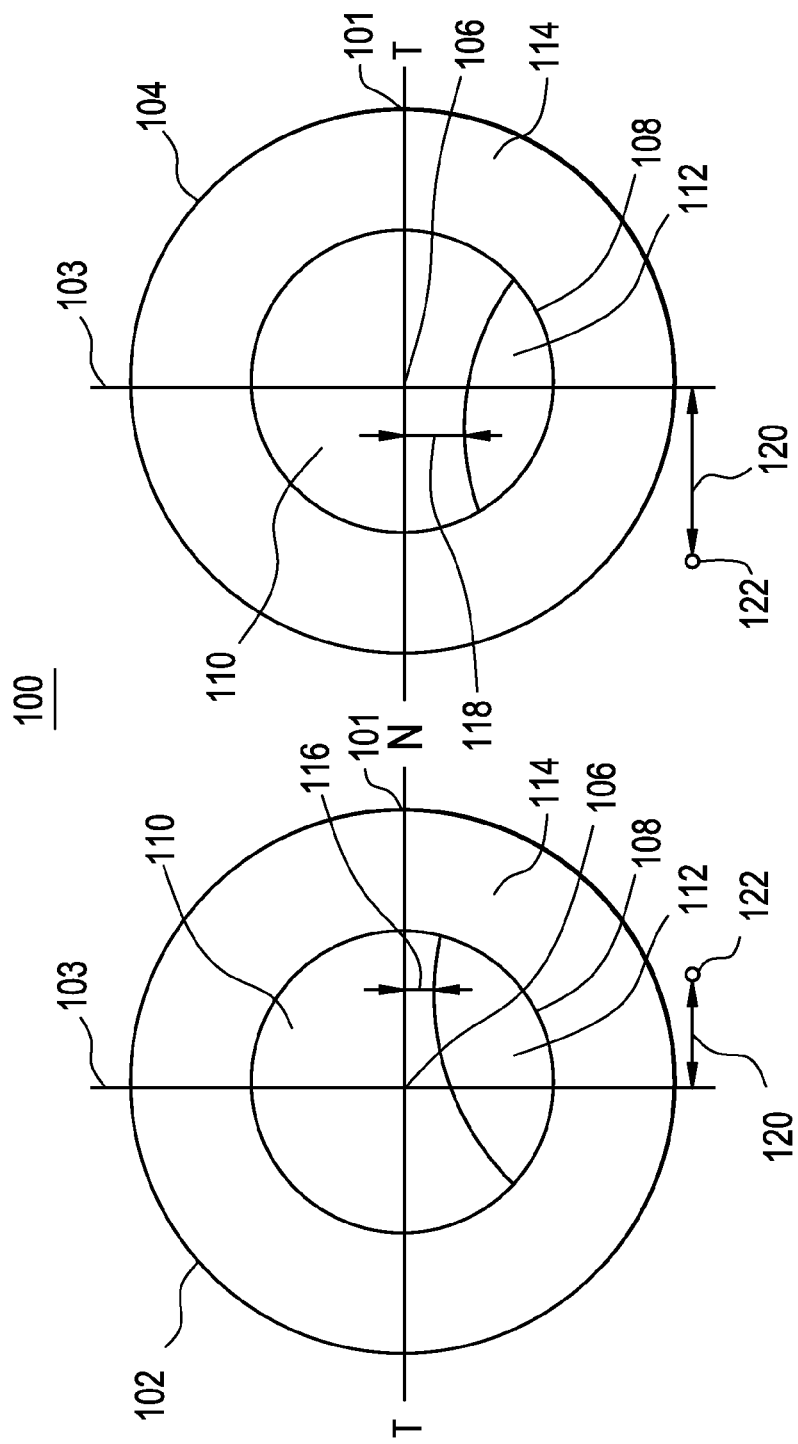
FIG. 1 is a diagrammatic plan view of one exemplary embodiment of a translating presbyopic contact lens pair having a first set of optical power zone features that are different in each lens of the pair in accordance with the present invention.

The present invention provides methods for correcting presbyopia, contact lenses for such correction, and methods for producing such contact lenses. The contact lenses of the present invention are translating, multifocal contact lens pairs comprising optical power zone features which are different in the first lens intended for the first eye as compared to optical power zone features of the second lens intended for the second eye. The optical power zones of the first and second lens of the pair may differ in segment height, power, asphericity, shape, orientation, inset, and/or any combinations thereof. The outer circumference of each lens of the translating lens pair may be substantially circular or smooth and continuous, flat and truncated, or it may be asymmetric. The contact lenses of the present invention comprise three main zones; namely, an optical zone, a peripheral zone located radially outwards from the optical zone with features which enable the lens to translate, and an edge zone located radially outwards from the peripheral zone and encompassing the lens edge.

The optical power zone is defined as the substantially central portion of the lens which comprises the visual power correction for the wearer's ametropia and presbyopia. Ametropia is defined as the optical power needed to provide good visual acuity, generally at far distance. It is recognized that this would include myopia or hyperopia, and astigmatism concurrent with either. Presbyopia is corrected by adding algebraically plus optical power to a portion of the optical zone to correct the wearer's near visual acuity requirements. It is recognized that these optical powers may be created by refractive means diffractive means, or both.

The optical power zone comprises at least at least one distance vision subzone and preferably at least one near vision subzone. Alternately, the optical power zone comprises at least at least one distance vision subzone and preferably at least one intermediate vision subzone. Alternately, the optical power zone has more than one distance vision subzone and/or more than one near vision subzone, and preferably, one distance vision subzone lies substantially at or above the horizontal meridian of the lens and a near vision subzone lies at or beneath the horizontal meridian as is set forth in detail subsequently.

Optionally, the optical power zone of the contact lens has one or more intermediate vision subzones. Intermediate vision subzones include a partial or fractional presbyopic add power. The optical power zone may be symmetrical or asymmetrical with respect to the vertical meridian of the lens. Preferably, it is vertically asymmetrical. The optical power zone is the combination of distance, near and optionally, intermediate vision subzones. The transitions between the distance, near and optionally intermediate subzones may be abrupt and occur over a very small distance, as seen in a step power change, or smooth and occur over a larger distance, as in a progressive power change. In a preferred exemplary embodiment, the transitions are as abrupt as possible to avoid discomfort for the wearer and also to minimize the translation required.

A distance vision subzone or portion is a region that provides the distance optical power or the amount of refractive power required to correct the contact lens wearer's distance vision acuity to the desired degree. A near vision subzone or portion is a region that provides the near optical power or the amount of refractive power required to correct the wearer's near vision acuity to the desired degree. An intermediate vision subzone or portion is a region that provides the optical power or the amount of refractive power required to correct the wearer's intermediate vision acuity for viewing objects typically between the wearer's preferred distance and near vision range. A multi-focal translating contact lens refers to a translating contact lens that comprises bifocal, trifocal or multi-focal optics.

The vertical meridian is defined as a line which runs from the inferior edge of the contact lens to the superior edge of the lens, through the geometric center of the contact lens. The horizontal meridian is defined as a line which runs from the nasal edge of the contact lens to the temporal edge of the contact lens, through the geometric center of the contact lens. The lens center is found at the intersection of the horizontal and vertical meridians.

The segment height is defined herein as the vertical distance from he lens center down to the closet vertical point of the near or intermediate vision subzone. Inset is defined herein as the nasalward horizontal displacement of the geometric center of the near or intermediate vision subzone relative to the lens center.

Asphericity, as it applies to either the distance vision subzone or the near vision subzone, or both, is the departure of the surface of that subzone from a spherical shape. The asphericity may be in the form of a conic, higher order polynomial, Chebyshev expression, bicubic, spline or trigonomertric function. In the case of the conic, the surface of a lens subzone may be described by the following equation, $$Z=cr^2/(1+(1-(1+k)c^2r^2)^{1/2}),$$

wherein Z is the sag of the contact lens surface i.e. the physical position in space of the surface, c is the curvature (reciprocal of radius), r is the radial position, and k is the conic constant. Different values of k result in various shapes as follows:

k=0 sphere
−1<k<0 ellipse
k=−1 parabola
k<−1 hyperbola
k>1 oblate ellipsoid

Referring to FIG. 1, there is illustrated a preferred exemplary embodiment of a pair of contact lenses 100 in accordance with the present invention. The contact lens 102 intended for the first eye is shown on the left, and the contact lens 104 intended for the second eye is shown on the right. The N refers to the nasal, or inner/nose side of the contact lens, and the T refers to the temporal, or outer/ear side of the contact lens. Both contact lenses 102, 104 have an anterior surface, as shown, and a posterior surface, that is not shown.

Lines 101 and 103 represent the horizontal, or 0-180 degree and vertical, or 90-270 degree meridians of the contact lenses 102, 104, respectively. At the intersection of the horizontal 101 and vertical 103 lines is the lens center 106. The outermost circumference of each contact lens 102, 104 is preferably symmetrical about the vertical meridian 103 and the horizontal meridian 101. On the anterior surface of each contact lens 102, 104 is an optical power zone 108 comprising a distance vision subzone 110 and a near or intermediate vision subzone 112. Peripheral to and surrounding the optical power zone 108 is the peripheral portion 114 of each contact lens 102, 104. The peripheral portion 114 comprises mechanical elements, described in more detail subsequently, which enable the contact lenses 102, 104 to rotationally orient themselves and to translate on the eye with downgaze.

In one preferred exemplary embodiment, the optical power zone 108 is symmetric around the lens center 106. In another preferred exemplary embodiment, the optical power zone 108 is not symmetric around the vertical meridian 103. In another preferred exemplary embodiment, the segment height 116 or vertical distance from the lens center to the closest vertical point of the near or intermediate vision subzone, for the first contact lens 102 is different than the segment height 118 of the second contact lens 104. In a preferred exemplary embodiment, the segment height 116 for the first contact lens 102 is between about 0 to about 1 mm and the segment height 118 of the second contact lens 104 is between about 0.4 to about 2 mm. In another preferred exemplary embodiment, the segment height 116 for the first contact lens 102 is between about 0 to about 0.6 mm and the segment height 118 of the second contact lens 104 is between about 0.6 to about 1.5 mm.

In another preferred exemplary embodiment, the optical power zone 108 of the first contact lens 102 comprises a distance vision subzone 110 and a near vision subzone 112, the optical power zone 108 of the second contact lens 104 comprises a distance vision subzone 110 and a near vision subzone 112, with the near vision subzone 112 of the first contact lens 102 having the full near vision power portion and the near vision subzone 112 of the second contact lens 104 having an intermediate power.

In another preferred exemplary embodiment, the optical power zone 108 of the first contact lens 102 comprises a distance vision subzone 110 and a near vision subzone 112, the optical power zone 108 of the second contact lens 104 comprises a distance vision subzone 110 and a near vision subzone 112, with the near vision subzone 112 of the first contact lens 102 having the full near vision power portion and, the near vision subzone 112 of the second contact lens 104 having an intermediate power of between about twenty-five (25) percent to about seventy-five (75) percent of the full add power.

In another preferred exemplary embodiment, the optical power zone 108 of the first contact lens 102 comprises a distance vision subzone 110 and a near vision subzone 112, the optical power zone 108 of the second contact lens 104 comprises a distance vision subzone 110 and a near vision subzone 112, with the near vision subzone 112 of the first contact lens 102 having the full near vision power portion and the near vision subzone 112 of the second contact lens 104 having an intermediate power about fifty (50) percent of the full add power.

In another preferred exemplary embodiment, the optical power zone 108 of the first contact lens 102 comprises a distance vision subzone 110 and a near vision subzone 112, the optical power zone 108 of the second contact lens 104 comprises a distance vision subzone 110 and a near vision subzone 112, with the near vision subzone 112 of the first contact lens 102 having an intermediate power and the near vision subzone 112 of the second contact lens 104 having a different intermediate power.

In another preferred exemplary embodiment, the optical power zone 108 of the first contact lens 102 comprises a distance vision subzone 110 and a near vision subzone 112, the optical power zone 108 of the second contact lens 102 comprises a distance vision subzone 110 and a near vision subzone 112, with the near vision subzone 112 of the first contact lens 102 having an intermediate power of between about ten (10) percent to about sixty (60) percent of the full add power, and the near vision subzone 112 of the second contact lens 104 having a power of between about fifty (50) percent to about eighty (80) percent of the full near power.

In another preferred exemplary embodiment, the optical power zone 108 of the first contact lens 102 comprises a distance vision subzone 110 and a near vision subzone 112, the optical power zone 108 of the second contact lens 104 comprises a distance vision subzone 110 and a near vision subzone 112, with the near vision subzone 112 of the first contact lens 102 having an intermediate power of between about twenty-five (25) percent to about fifty (50) percent of the full add power, and the near vision subzone 112 of the second contact lens 104 having a power of between about sixty (60) percent to about seventy (70) percent of the full near power.

In another preferred exemplary embodiment, the optical power zone 108 of the first contact lens 102 comprises a distance vision subzone 110 and a near vision subzone 112, the optical power zone 108 of the second contact lens 104 comprises a distance vision subzone 110 and a near vision subzone 112, with the near vision subzone 112 of the first contact lens 102 having an intermediate power of about thirty-five (35) percent of the full add power, and the near vision subzone 112 of the second contact lens 104 having a power of about sixty-five (65) percent of the full near power.

In another preferred exemplary embodiment, the optical power zone 108 of the first contact lens 102 comprises a distance vision subzone 110 and a near vision subzone 112, the optical power zone 108 of the second contact lens 104 comprises a distance vision subzone 110 and a near vision subzone 112, wherein any power subzone may comprise a spherical or aspherical surface.

In another preferred exemplary embodiment, the optical power zone 108 of the first contact lens 102 comprises a distance vision subzone 110 and a near vision subzone 112 and the optical power zone 108 of the second contact lens 104 comprises a distance vision subzone 110 and a near vision subzone 112, with the conic constant of any subzone being between about +0.5 to about −1.0.

In another preferred exemplary embodiment, the optical power zone 108 of the first contact lens 102 comprises a distance vision subzone 110 and a near vision subzone 112, and the optical power zone 108 of the second contact lens 104 comprises a distance vision subzone 110 and a near vision subzone 112, with the conic constant of any subzone being between about +0.0 to about −0.5.

In another preferred exemplary embodiment, the optical power zone 108 of the first contact lens 102 comprises a distance vision subzone 110 and a near vision subzone 112, and the optical power zone 108 of the second contact lens 104 comprises a distance vision subzone 110 and a near vision subzone 112, with the conic constant of any subzone being between about −0.25.

In another preferred exemplary embodiment, the optical power zone 108 of the first contact lens 102 comprises a distance vision subzone 110 and a near vision subzone 112, and the optical power zone 108 of the second contact lens 104 comprises a distance vision subzone 110 and a near vision subzone 112, with the highest order polynomial in the equation describing the surface of any subzone being between about two (2) to about twelve (12).

In another preferred exemplary embodiment, the optical power zone 108 of the first contact lens 102 comprises a distance vision subzone 110 and a near vision subzone 112, and the optical power zone 108 of the second contact lens 104 comprises a distance vision subzone 110 and a near vision subzone 112, with the highest order polynomial in the equation describing the surface of any subzone being between about three (3) to about six (6).

In another preferred exemplary embodiment, the optical power zone 108 of the first contact lens 102 comprises a distance vision subzone 110 and a near vision subzone 112, and the optical power zone 108 of the second contact lens 104 comprises a distance vision subzone 110 and a near vision subzone 112, with the equation describing the surface of any subzone being between one described by a bicubic, spline, Chebyshev or trigonometric function.

In another preferred exemplary embodiment, the segment inset 120 or horizontal distance from the vertical meridian 103 to the near or intermediate vision segment optical center 122 for the first contact lens 102 is different than the segment inset 120 or horizontal distance from the vertical meridian 103 to the near or intermediate vision segment optical center 122 of the second contact lens 104. In a preferred exemplary embodiment, the segment inst 120 for the first contact lens 102 is between about 0 to about 2 mm and the segment inset 120 of the second contact lens 104 is between about 0.4 to about 2.5 mm. In another preferred exemplary embodiment, the segment inset 120 for the first contact lens 102 is between about 0.5 to about 1.5 mm and the segment inset 120 of the second contact lens 104 is between about 1 to about 2 mm.

For convenience, the boundaries of the various zones illustrated in FIG. 1 are shown as discrete lines; however, one of ordinary skill in the relevant art will recognize that the boundaries may be blended by any suitable means. What is important to note is the lack of symmetry between the two lenses of the contact lens pair with respect to the intermediate or near vision subzone 112.

Figure 2:
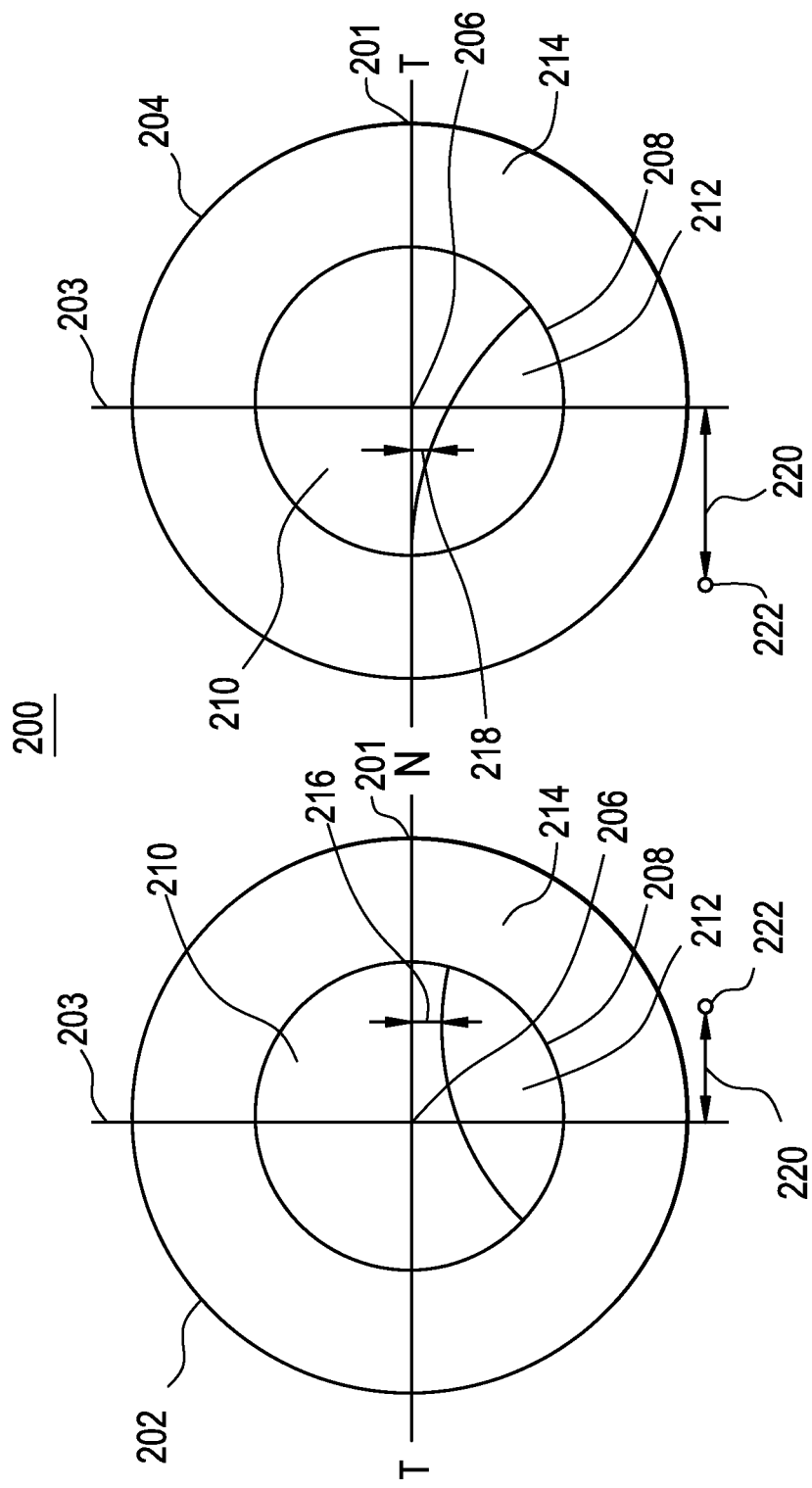
FIG. 2 is a diagrammatic plan view of another exemplary embodiment of a translating presbyopic contact lens pair having a second set of optical power zone features that are different in each lens of the pair in accordance with the present invention.

Referring now to FIG. 2, there is illustrated another preferred exemplary embodiment of a pair of contact lenses 200 in accordance with the present invention. The contact lens 202 intended for the first eye is shown on the left, and the contact lens 204 intended for the second eye is shown on the right. The N, as before, refers to the nasal, or inner/nose side of the contact lens, and the T, as before, refers to the temporal, or outer/ear side. Each contact lens 202, 204 has an anterior surface, as shown, and a posterior surface, that is not shown.

Lines 201 and 203 represent the horizontal, or 0-180 degree, and vertical, or 90-270 degree, meridians of each contact lens 202, 204, respectively. At the intersection of the horizontal 201 and vertical 203 lines is the lens center 206. The outermost circumference of each contact lens 202, 204 is preferably symmetrical about the vertical meridian 203 and the horizontal meridian 201. On the anterior surface of each contact lens 202, 204 is an optical power zone 208 comprising a distance vision subzone 210 and a near or intermediate vision subzone 212. Peripheral of and surrounding the optical power zone 208 is the peripheral portion 214 of each contact lens 202, 204. The peripheral portion 214 comprises mechanical elements, described in more detail subsequently, which enable each contact lens 202, 204 to rotationally orient itself, and to translate on the eye with downgaze.

In a preferred exemplary embodiment, the optical power zone 208 is symmetric around the lens center 206. In another preferred exemplary embodiment, the optical power zone 208 is not symmetric around the vertical meridian 203. In another preferred exemplary embodiment, the rotation of the near or intermediate vision subzone 212, defined by segment height 216, on the first contact lens 202 is different from the rotation of the near or intermediate power subzone 212, defined by segment height 218, on the second contact lens 204. In a preferred exemplary embodiment, the segment height 216 for the first contact lens 202 is between about 0 to about 1 mm and the segment height 218 of the second contact lens 204 is between about 0.4 to about 2 mm. In another preferred exemplary embodiment, the segment height 216 for the first contact lens 202 is between about 0 to about 0.6 mm and the segment height 218 of the second contact lens 204 is between about 0.6 to about 1.5 mm.

In another preferred exemplary embodiment, the optical power zone 208 of the first contact lens 202 comprises a distance vision subzone 210 and a near vision subzone 212, the optical power zone 208 of the second contact lens 204 comprises a distance vision subzone 210 and a near vision subzone 212, with the near vision subzone 212 of the first contact lens 202 having the full near vision power portion and the near vision subzone 212 of the second contact lens 204 having an intermediate power.

In another preferred exemplary embodiment, the optical power zone 208 of the first contact lens 202 comprises a distance vision subzone 210 and a near vision subzone 212, the optical power zone 208 of the second contact lens 204 comprises a distance vision subzone 210 and a near vision subzone 212, with the near vision subzone 212 of the first contact lens 202 having the full near vision power portion and, the near vision subzone 212 of the second contact lens 204 having an intermediate power of between about twenty-five (25) percent to about seventy-five (75) percent of the full add power.

In another preferred exemplary embodiment, the optical power zone 208 of the first contact lens 202 comprises a distance vision subzone 210 and a near vision subzone 212, the optical power zone 208 of the second contact lens 204 comprises a distance vision subzone 210 and a near vision subzone 212, with the near vision subzone 212 of the first contact lens 202 having the full near vision power portion and the near vision subzone 212 of the second contact lens 204 having an intermediate power about fifty (50) percent of the full add power.

In another preferred exemplary embodiment, the optical power zone 208 of the first contact lens 202 comprises a distance vision subzone 210 and a near vision subzone 212, the optical power zone 208 of the second contact lens 204 comprises a distance vision subzone 210 and a near vision subzone 212, with the near vision subzone 212 of the first contact lens 202 having an intermediate power and the near vision subzone 212 of the second contact lens 204 having a different intermediate power.

In another preferred exemplary embodiment, the optical power zone 208 of the first contact lens 202 comprises a distance vision subzone 210 and a near vision subzone 212, the optical power zone 208 of the second contact lens 202 comprises a distance vision subzone 210 and a near vision subzone 212, with the near vision subzone 212 of the first contact lens 202 having an intermediate power of between about ten (10) percent to about sixty (60) percent of the full add power, and the near vision subzone 212 of the second contact lens 204 having a power of between about fifty (50) percent to about eighty (80) percent of the full near power.

In another preferred exemplary embodiment, the optical power zone 208 of the first contact lens 202 comprises a distance vision subzone 210 and a near vision subzone 212, the optical power zone 208 of the second contact lens 204 comprises a distance vision subzone 210 and a near vision subzone 212, with the near vision subzone 212 of the first contact lens 202 having an intermediate power of between about twenty-five (25) percent to about fifty (50) percent of the full add power, and the near vision subzone 212 of the second contact lens 204 having a power of between about sixty (60) percent to about seventy (70) percent of the full near power.

In another preferred exemplary embodiment, the optical power zone 108 of the first contact lens 202 comprises a distance vision subzone 110 and a near vision subzone 212, the optical power zone 208 of the second contact lens 204 comprises a distance vision subzone 210 and a near vision subzone 212, with the near vision subzone 212 of the first contact lens 202 having an intermediate power of about thirty-five (35) percent of the full add power, and the near vision subzone 212 of the second contact lens 204 having a power of In another preferred exemplary embodiment, the optical power zone 208 of the first contact lens 202 comprises a distance vision subzone 210 and a near vision subzone 212, the optical power zone 208 of the second contact lens 204 comprises a distance vision subzone 210 and a near vision subzone 212, wherein any power subzone may comprise a spherical or aspherical surface.

In another preferred exemplary embodiment, the optical power zone 208 of the first contact lens 202 comprises a distance vision subzone 210 and a near vision subzone 212 and the optical power zone 208 of the second contact lens 204 comprises a distance vision subzone 210 and a near vision subzone 212, with the conic constant of any subzone being between about +0.5 to about −1.0.

In another preferred exemplary embodiment, the optical power zone 208 of the first contact lens 202 comprises a distance vision subzone 210 and a near vision subzone 212, and the optical power zone 208 of the second contact lens 204 comprises a distance vision subzone 210 and a near vision subzone 212, with the conic constant of any subzone being between about +0.0 to about −0.5.

In another preferred exemplary embodiment, the optical power zone 208 of the first contact lens 202 comprises a distance vision subzone 210 and a near vision subzone 212, and the optical power zone 208 of the second contact lens 204 comprises a distance vision subzone 210 and a near vision subzone 212, with the conic constant of any subzone being between about −0.25.

In another preferred exemplary embodiment, the optical power zone 208 of the first contact lens 202 comprises a distance vision subzone 210 and a near vision subzone 212, and the optical power zone 208 of the second contact lens 204 comprises a distance vision subzone 210 and a near vision subzone 212, with the highest order polynomial in the equation describing the surface of any subzone being between about two (2) to about twelve (12).

In another preferred exemplary embodiment, the optical power zone 208 of the first contact lens 202 comprises a distance vision subzone 210 and a near vision subzone 212, and the optical power zone 208 of the second contact lens 204 comprises a distance vision subzone 210 and a near vision subzone 212, with the highest order polynomial in the equation describing the surface of any subzone being between about three (3) to about six (6).

In another preferred exemplary embodiment, the optical power zone 208 of the first contact lens 202 comprises a distance vision subzone 210 and a near vision subzone 212, and the optical power zone 208 of the second contact lens 204 comprises a distance vision subzone 210 and a near vision subzone 212, with the equation describing the surface of any subzone being between one described by a bicubic, spline, Chebyshev or trigonometric function.

In another preferred exemplary embodiment, the segment inset 220 or horizontal distance from the vertical meridian 203 to the near or intermediate vision segment optical center 222 for the first contact lens 202 is different than the segment inset 220 or horizontal distance from the vertical meridian 203 to the near or intermediate vision segment optical center 222 of the second contact lens 204. In a preferred exemplary embodiment, the segment inset 220 for the first contact lens 202 is between about 0 to about 2 mm. and the segment inset 220 of the second contact lens 204 is between about 0.4 to about 2.5 mm. In another preferred exemplary embodiment, the segment inset 220 for the first contact lens 202 is between about 0.5 to about 1.5 mm and the segment inset 220 of the second contact lens 204 is between about 1 to about 2 mm.

Once again, for convenience, the boundaries of the various zones illustrated in FIG. 2 are shown as discrete lines; however, one of ordinary skill in the relevant art will recognize that the boundaries may be blended by any suitable means. Comparing the contact lens pair 100 illustrated in FIG. 1 and the contact lens pair 200, one can readily see that the near or intermediate power subzones 112, 212 differ in at least one of segment height, shape, orientation or rotation and inset.

Referring now to FIG. 3, there is illustrated another preferred exemplary embodiment of a pair of contact lenses 300 in accordance with the present invention. The contact lens 302 intended for the first eye is shown on the left, and the contact lens 304 intended for the second eye is shown on the right. The N, as before, refers to the nasal, or inner/nose side of the contact lens, and the T, as before, refers to the temporal or outer/ear side of the contact lens. Each contact lens 302, 304 has an anterior surface, as shown, and a posterior surface, that is not shown.

Lines 301 and 303 represent the horizontal, or 0-180 degree, and vertical, or 90-270 degree, meridians of each contact lens 302, 304 respectively. At the intersection of the horizontal 301 and vertical 303 lines is the lens center 306. The outermost circumference of each contact lens 302, 304 is preferably symmetrical about the vertical meridian 303 and horizontal meridian 301. On the anterior surface of each contact lens 302, 304 is an optical power zone 308 comprising a distance vision subzone 310 and a near or intermediate vision subzone 312. Peripheral to and surrounding the optical power zone 308 is the peripheral portion 314 of each contact lens 302, 304. The peripheral portion 314 comprises mechanical elements, described in more detail subsequently, which enable the contact lens 302, 304 to rotationally orient itself, and to translate on the eye with downgaze.

In a preferred exemplary embodiment, the optical power zone 308 is symmetric around the lens center 306. In another preferred exemplary embodiment, the optical power zone 308 is not symmetric around the vertical meridians 303. In another preferred exemplary embodiment, the inset of the near or intermediate vision subzone 312 defined by segment height 316, on the first contact lens 302 is different from the inset of the near or intermediate power subzone 312 defined by segment height 318 on the second contact lens 304. In a preferred exemplary embodiment, the segment height 316 for the first contact lens 302 is between about 0 to about 1 mm and the segment height 318 of the second contact lens 304 is between about 0.4 to about 2 mm. In another preferred exemplary embodiment, the segment height 316 for the first contact lens 302 is between about 0 to about 0.6 mm and the segment height 318 of the second contact lens 304 is between about 0.6 to about 1.5 mm.

In another preferred exemplary embodiment, the optical power zone 308 of the first contact lens 302 comprises a distance vision subzone 310 and a near vision subzone 312, the optical power zone 308 of the second contact lens 304 comprises a distance vision subzone 310 and a near vision subzone 312, with the near vision subzone 312 of the first contact lens 302 having the full near vision power portion and the near vision subzone 312 of the second contact lens 304 having an intermediate power.

In another preferred exemplary embodiment, the optical power zone 308 of the first contact lens 302 comprises a distance vision subzone 310 and a near vision subzone 312, the optical power zone 308 of the second contact lens 304 comprises a distance vision subzone 310 and a near vision subzone 312, with the near vision subzone 312 of the first contact lens 302 having the full near vision power portion and, the near vision subzone 312 of the second contact lens 304 having an intermediate power of between about twenty-five (25) percent to about seventy-five (75) percent of the full add power.

In another preferred exemplary embodiment, the optical power zone 308 of the first contact lens 302 comprises a distance vision subzone 310 and a near vision subzone 312, the optical power zone 308 of the second contact lens 304 comprises a distance vision subzone 310 and a near vision subzone 312, with the near vision subzone 312 of the first contact lens 302 having the full near vision power portion and the near vision subzone 312 of the second contact lens 304 having an intermediate power about fifty (50) percent of the full add power.

In another preferred exemplary embodiment, the optical power zone 308 of the first contact lens 302 comprises a distance vision subzone 310 and a near vision subzone 312, the optical power zone 308 of the second contact lens 304 comprises a distance vision subzone 310 and a near vision subzone 312, with the near vision subzone 312 of the first contact lens 302 having an intermediate power and the near vision subzone 312 of the second contact lens 304 having a different intermediate power.

In another preferred exemplary embodiment, the optical power zone 308 of the first contact lens 302 comprises a distance vision subzone 310 and a near vision subzone 312, the optical power zone 308 of the second contact lens 302 comprises a distance vision subzone 310 and a near vision subzone 312, with the near vision subzone 312 of the first contact lens 302 having an intermediate power of between about ten (10) percent to about sixty (60) percent of the full add power, and the near vision subzone 312 of the second contact lens 304 having a power of between about fifty (50) percent to about eighty (80) percent of the full near power.

In another preferred exemplary embodiment, the optical power zone 308 of the first contact lens 302 comprises a distance vision subzone 310 and a near vision subzone 312, the optical power zone 308 of the second contact lens 304 comprises a distance vision subzone 310 and a near vision subzone 312, with the near vision subzone 312 of the first contact lens 302 having an intermediate power of between about twenty-five (25) percent to about fifty (50) percent of the full add power, and the near vision subzone 312 of the second contact lens 304 having a power of between about sixty (60) percent to about seventy (70) percent of the full near power.

In another preferred exemplary embodiment, the optical power zone 308 of the first contact lens 302 comprises a distance vision subzone 310 and a near vision subzone 312, the optical power zone 308 of the second contact lens 304 comprises a distance vision subzone 310 and a near vision subzone 312, with the near vision subzone 312 of the first contact lens 302 having an intermediate power of about thirty-five (35) percent of the full add power, and the near vision subzone 312 of the second contact lens 304 having a power of about sixty-five (65) percent of the full near power.

In another preferred exemplary embodiment, the optical power zone 308 of the first contact lens 302 comprises a distance vision subzone 310 and a near vision subzone 312, the optical power zone 308 of the second contact lens 304 comprises a distance vision subzone 310 and a near vision subzone 312, wherein any power subzone may comprise a spherical or aspherical surface.

In another preferred exemplary embodiment, the optical power zone 308 of the first contact lens 302 comprises a distance vision subzone 310 and a near vision subzone 312 and the optical power zone 308 of the second contact lens 304 comprises a distance vision subzone 310 and a near vision subzone 312, with the conic constant of any subzone being between about +0.5 to about −1.0.

In another preferred exemplary embodiment, the optical power zone 308 of the first contact lens 302 comprises a distance vision subzone 310 and a near vision subzone 312, and the optical power zone 308 of the second contact lens 304 comprises a distance vision subzone 310 and a near vision subzone 312, with the conic constant of any subzone being between about +0.0 to about −0.5.

In another preferred exemplary embodiment, the optical power zone 308 of the first contact lens 302 comprises a distance vision subzone 310 and a near vision subzone 312, and the optical power zone 308 of the second contact lens 304 comprises a distance vision subzone 310 and a near vision subzone 312, with the conic constant of any subzone being between about −0.25.

In another preferred exemplary embodiment, the optical power zone 308 of the first contact lens 302 comprises a distance vision subzone 310 and a near vision subzone 312, and the optical power zone 308 of the second contact lens 304 comprises a distance vision subzone 310 and a near vision subzone 312, with the highest order polynomial in the equation describing the surface of any subzone being between about two (2) to about twelve (12).

In another preferred exemplary embodiment, the optical power zone 308 of the first contact lens 302 comprises a distance vision subzone 310 and a near vision subzone 312, and the optical power zone 308 of the second contact lens 304 comprises a distance vision subzone 310 and a near vision subzone 312, with the highest order polynomial in the equation describing the surface of any subzone being between about three (3) to about six (6).

In another preferred exemplary embodiment, the optical power zone 308 of the first contact lens 302 comprises a distance vision subzone 310 and a near vision subzone 312, and the optical power zone 308 of the second contact lens 304 comprises a distance vision subzone 310 and a near vision subzone 312, with the equation describing the surface of any subzone being between one described by a bicubic, spline, Chebyshev or trigonometric function.

In another preferred exemplary embodiment, the segment inset 320 or horizontal distance from the vertical meridian 303 to the near or intermediate vision segment optical center 322 for the first contact lens 302 is different than the segment inset 320 or horizontal distance from the vertical meridian 303 to the near or intermediate vision segment optical center 322 of the second contact lens 304. In a preferred exemplary embodiment, the segment inset 320 for the first contact lens 302 is between about 0 to about 2 mm and the segment inset 320 of the second contact lens 304 is between about 0.4 to about 2.5 mm. In another preferred exemplary embodiment, the segment inset 320 for the first contact lens 302 is between about 0.5 to about 1.55 mm and the segment inset 322 of the second contact lens 304 is between about 1 to about 2 mm.

Once again, for convenience, the boundaries of the various zones illustrated in FIG. 3 are shown as discrete lines; however, one of ordinary skill in the relevant art will recognize that the boundaries may be blended by any suitable means. Comparing the contact lens pair 100 illustrated in FIG. 1, the contact lens pair 200 illustrated in FIG. 2 and the contact lens pair 300 illustrated in FIG. 3, one can readily see that the near or intermediate power subzones 112, 212 and 312 differ in at least one of segment, height, shape, orientation or rotation and inset.

It is important to note that certain features such as segment height, asphericity and inset may be based upon a certain population, sub-population, group or an individual. Working with individuals allows for the development of completely custom contact lenses which may be tailored directly to the individual's need.

Various measurements are utilized to provide data for vision correction and are incorporated into contact lens design and production. Conventional refraction yields the patient's low order sphero-cylindrical corrective prescription components. These components include the spherical power, the cylindrical power and axis. Higher order refractive correction is enabled by a wavefront measurement. Ocular wavefront data is collected from a patient using a wavefront sensor such as a COAS aberrometer available from Wavefront Sciences Inc., Albuquerque, N. Mex. This wavefront data is generally in the form of Zernike polynomial coefficients, but may also be a set of wavefront heights at specified Cartesian or polar coordinates. A preferred system to designate the Zernike coefficients is described as the OSA method in ANSI Z80.28.

Data regarding the topography of the cornea is collected from a patient using a corneal topographer such as the Keratron or Keratron Scout available from Optikon 2000 S.p.A, Rome, Italy. These devices function by interpreting the reflection of multiple annular ring images off of the cornea. The topographic data is available in a number of formats, including a topographic elevation map. The topography data may be utilized in customizing contact lens design or may be used to guide selection of the most appropriate back surface contact lens shape.

Other measurements may be taken utilizing contact lenses with markings thereon. For example, fiducialized contact lenses may be used to determine contact lens centration and rotation in any direction of gaze including primary gaze, peripheral gaze and reading gaze with the inclusion of appropriately positioned cameras. These fiducials may also be used on any type of contact lens in a research setting to gather population data on features such as centration and rotational performance.

Figure 4A:
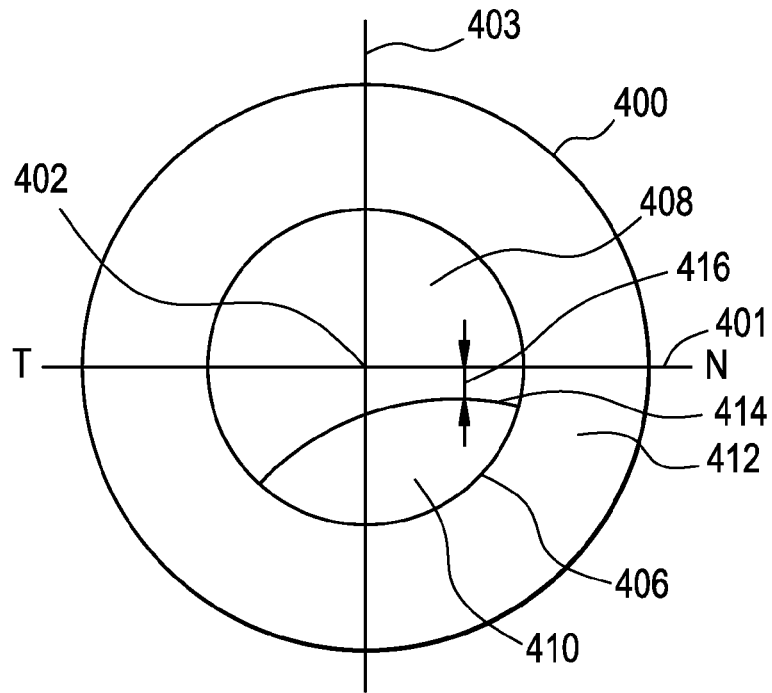
FIGS. 4A-4E are plain views of exemplary optical power zone shapes in accordance with the present invention.

Referring now to FIG. 4A, there is illustrated another preferred exemplary embodiment of a single contact lens 400 in accordance with the present invention. The contact lens 400 has an interior surface, as shown, and a posterior surface, that is not shown.

Lines 401 and 403 represent the horizontal, or 0-180 degree, and vertical, or 90-270 degree, meridians of the contact lens 400, respectively. At the intersection of the horizontal 401 and vertical 403 lines is the lens center 402. The outermost circumference of the contact lens 400 is preferably symmetrical about the vertical meridian 403 and horizontal meridian 401. On the anterior surface of the contact lens 400 is an optical power zone 406 comprising a distance vision subzone 408 and a near or intermediate vision subzone 410.

Peripheral to and surrounding the optical power zone 406 is the peripheral portion 412 of the contact lens 400. The peripheral portion 412 comprises mechanical elements, described in more detail subsequently, which enable the contact lens 400 to rotationally orient itself, and to translate on the eye with downgaze.

In a preferred exemplary embodiment, the near power subzone 410 is arcuate in shape and defined in part by an inner edge or a line of demarcation 414 that is separated from the horizontal median 401 by segment height 416, comprising a section of a circle, an ellipse or similar geometric pattern. Once again, for convenience, the boundaries of the various zones in all of FIG. 4A are shown as discrete lines; however, one of ordinary skill in the art will recognize that the boundaries may be blended by any suitable means.

Figure 4B:
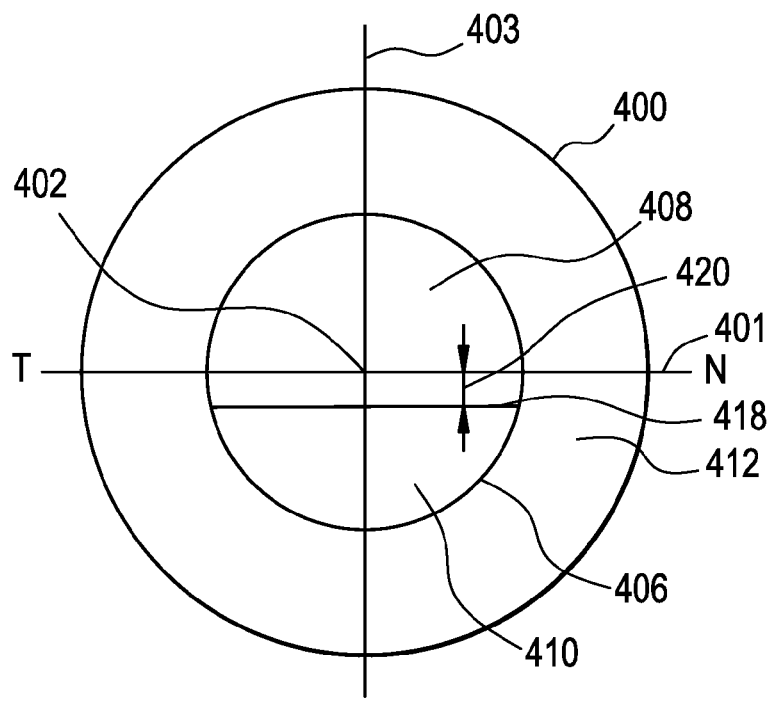

Referring now to FIG. 4B, there is illustrated another preferred exemplary embodiment of a single contact lens 400 in accordance with the present invention. The contact lens 400 has an anterior surface, as shown, and a posterior surface, that is not shown.

Lines 401 and 403 represent the horizontal, or 0-180 degree, and vertical, or 90-270 degree, meridians of the contact lens 400, respectively. At the intersection of the horizontal 401 and vertical 403 lines is the lens center 402. The outermost circumference of the contact lens 400 is preferably symmetrical about the vertical meridian 403 and horizontal meridian 401. On the anterior surface of the contact lens 400 is an optical power zone 406 comprising a distance vision subzone 408 and a near or intermediate vision subzone 410.

Peripheral to and surrounding the optical power zone 406 is the peripheral portion 412 of the contact lens 400. The peripheral portion 412 comprises mechanical elements, described in more detail subsequently, which enable the contact lens 400 to rotationally orient itself, and to translate on the eye with downgaze.

In a preferred exemplary embodiment, the near power subzone 410 is arcuate in shape, comprising a substantially straight line, flat interface and/or similar line of demarcation 418 that is separated from the horizontal meridian 401 by segment height 420. Once again, for convenience, the boundaries of the various zones in FIG. 4B are shown as discrete lines; however, one of ordinary skill in the relevant art will recognize that the boundaries may be blended by any suitable means.

Figure 4C:
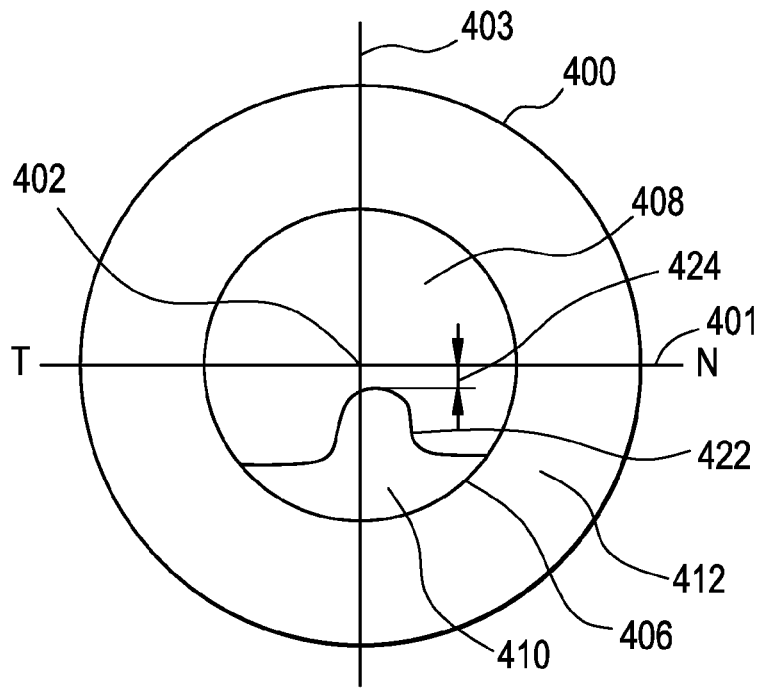

Referring now to FIG. 4C, there is illustrated another preferred exemplary embodiment of a single contact lens 400 in accordance with the present invention. The contact lens 400 has an anterior surface, as shown, and a posterior surface, that is not shown.

Lines 401 and 403 represent the horizontal, or 0-180 degree, and vertical, or 90-270 degree, meridians of the contact lens 400, respectively. At the intersection of the horizontal 401 and vertical 403 lines is the lens center 402. The outermost circumference of the contact lens 400 is preferably symmetrical about the vertical meridian 403 and horizontal meridian 401. On the anterior surface of the contact lens 400 is an optical power zone 406 comprising a distance vision subzone 408 and a near or intermediate vision subzone 410.

Peripheral to and surrounding the optical power zone 406 is the peripheral portion 412 of the contact lens 400. The peripheral portion 412 comprises mechanical elements, described in more detail subsequently, which enable the contact lens 400 to rotationally orient itself, and to translate on the eye with downgaze.

In a preferred exemplary embodiment, the near power subzone 410 is arcuate in shape, comprising a section of a pulse-like shape or similar line of demarcation 422 that is separate from the horizontal meridian 401 by segment height 424. Once again, for convenience, the boundaries of the various zones in all of FIG. 4C are shown as discrete lines; however, one of ordinary skill in the art will recognize that the boundaries may be blended by any suitable means.

Figure 4D:
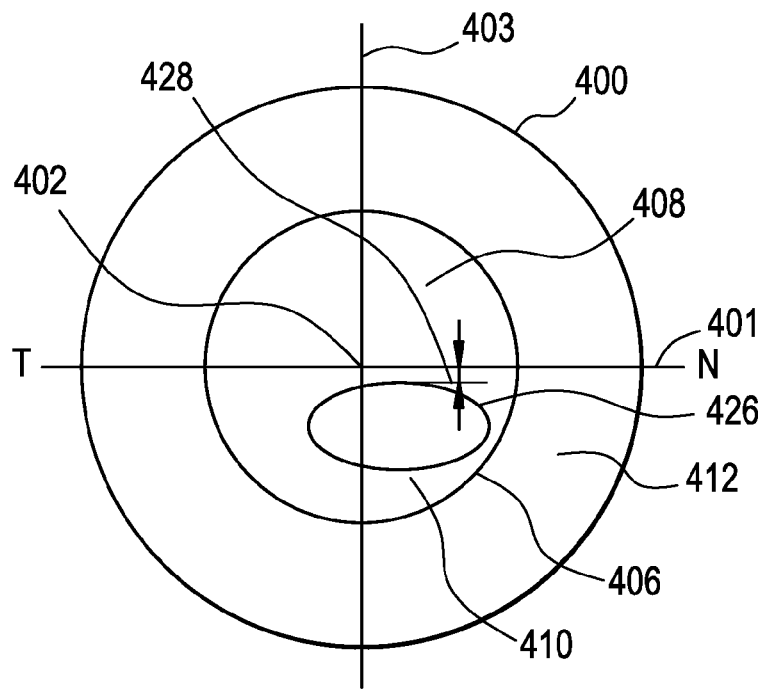

Referring now to FIG. 4D, there is illustrated another preferred exemplary embodiment of a single contact lens 400 in accordance with the present invention. The contact lens 400 has an interior surface, as shown, and a posterior surface, that is not shown.

Lines 401 and 403 represent the horizontal, or 0-180 degree, and vertical, or 90-270 degree meridians of the contact lens 400, respectively. At the intersection of the horizontal 401 and vertical 403 lines is the lens center 402. The outermost circumference of the contact lens 400 is preferably symmetrical about the vertical meridian 403 and horizontal meridian 401. On the anterior surface of the contact lens 400 is an optical power zone 406 comprising a distance vision subzone 408 and a near or intermediate vision subzone 410.

Peripheral to and surrounding the optical power zone 406 is the peripheral portion 412 of the contact lens 400. The peripheral portion 412 comprises mechanical elements, described in more detail subsequently, which enable the contact lens 400 to rotationally orient itself, and to translate on the eye with downgaze.

In a preferred exemplary embodiment, the near power subzone 410 is arcuate in shape, comprising a circle, an ellipse or other line of demarcation 426 that is separated from the horizontal meridian 401 by a segment height 428. Once again for convenience, the boundaries of the various zones in all of FIG. 4D are shown as discrete lines; however, one of ordinary skill in the art will recognize that the boundaries may be blended by any suitable means.

Figure 4E:
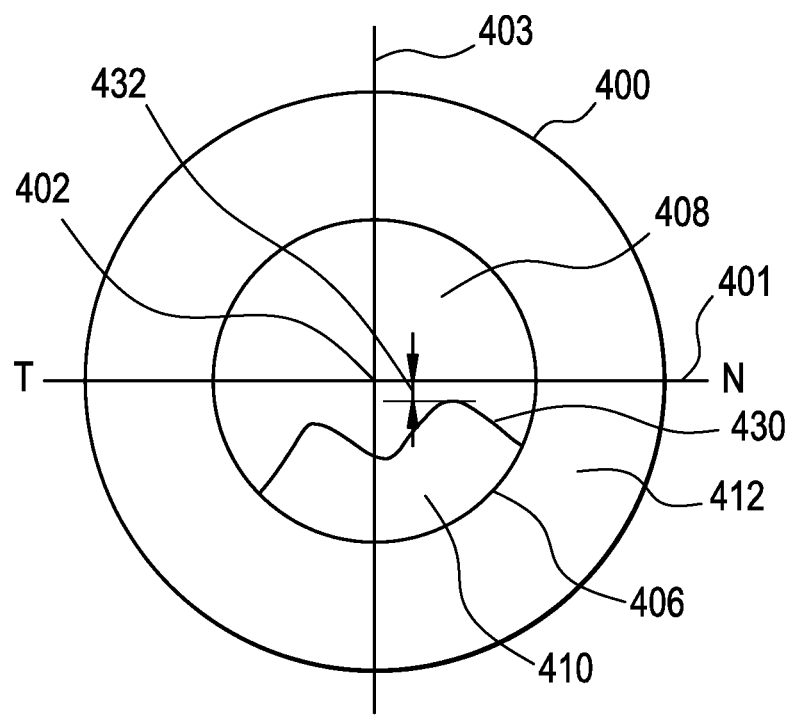

Referring now to FIG. 4E, there is illustrated another preferred exemplary embodiment of a single contact lens in accordance with the present invention. The contact lens 400 has an anterior surface, as shown, and a posterior surface, that is not shown.

Lines 401 and 403 represent the horizontal, or 0-180 degree, and vertical, or 90-270 degree meridians of the contact lens 400, respectively. At the intersection of the horizontal 401 and vertical 403 lines is the lens center 402. The outermost circumference of the contact lens 400 is preferably symmetrical about the vertical meridian 403 and the horizontal meridian 401. On the anterior surface of the contact lens 400 is an optical power zone 406 comprising a distance vision subzone 408 and a near or intermediate vision subzone 410.

Peripheral to and surrounding the optical power zone 406 is the peripheral portion 412 of the contact lens 400. The peripheral portion 412 comprises mechanical elements, described in more detail subsequently, which enable said lens 400 to rotationally orient itself, and to translate on the eye with downgaze.

In a preferred exemplary embodiment, the near power subzone 410 comprises a "batwing" or double pulse or similar shape indicted by line of demarcation 430 that is separated from the horizontal median 401 by segment height 432, wherein the two pulses are separated to enable the junction between the distance power subzone 408 and the near or intermediate subzone 410 to be lower on or substantially near the vertical meridian 403. For convenience, the boundaries of the various zones in all of FIG. 4E are shown as discrete lines;

however, one of ordinary skill in the relevant art will recognize that the boundaries may be blended by any suitable means.

It is important to note that other shapes are possible for the near or intermediate vision subzone. The near vision subzone optics may be bifocal, trifocal or have even more vision zones. Optical zones may be circular or non circular in shape, arcuate, straight line, multiple concentric, radially varying concentric, and/or progressively changing power functions, and geometric inset segments.

The optical power zone of a multi-focal translating contact lens according to the present invention may include a distance vision subzone, and an intermediate or near vision subzone. The multi-focal translating contact lens may provide distance vision correction at a primary gaze, for example, driving, intermediate vision correction at a half-down-gaze, for example, work on a computer, and near vision correction at full-down-gaze, for example, reading books and newspapers.

In one exemplary embodiment, the intermediate vision subzone in a multi-focal translating contact lens of the present invention is a progressive power zone, which has an optical power that continuously changes from distance vision to the near vision. Effective use of a trifocal translating contact lens or a multi-focal translating contact lens having a progressive power zone requires varying amounts of translating across the surface of the eye when the eye changes from gazing at an object at a distance (primary gaze) to gazing at an object at an intermediate distance (partially-down or half-down gaze) or to gazing at a nearby object (fully-down gaze). This is controlled by the presence of the pseudotruncation.

The contact lenses of the present invention may optionally include features to orient the lens for stabilization as set forth above. These are in addition to the pseudotruncation and serve to make sure that the pseudotruncation is on the bottom of the lens, adjacent to the lower eyelid when worn. Stabilization or orientation features include stabilization zones, prism ballast, slab off, dynamic stabilization and the like. Essentially, any suitable means may be utilized as a stabilization means as is known in the art.

Pseudotruncation as used herein refers to thickened regions in the lens peripheral portion 114 which function similarly to true flat truncations by providing a surface for the lid to interact with the lens and cause it to translate. For example, a pseudotruncation may comprise a design feature placed on the anterior surface of the contact lens in the peripheral zone or portion 114 surrounding the optical zone 108 that enables a contact lens with the feature or features to translate or move on the eye as the direction of gaze changes so that distance and/or near vision is corrected accordingly. Translation occurs via the interaction between the pseudotruncation feature and the lower eye lid.

The contact lenses of the present invention may be either hard or soft lenses, but preferably are soft contact lenses. Soft contact lenses, made of any material suitable for producing such lenses, are preferably utilized in accordance with the present invention. Suitable preferred materials for forming soft contact lenses using the method of the present invention include, without limitation, those disclosed in U.S. Pat. Nos. 5,371,147, 5,314,960, and 5,057,578 incorporated in their entireties herein by reference, hydrogels, silicone-containing hydrogels, and the like, as well as combinations thereof. More preferably, the lens materials comprises a siloxane functionality, including, without limitation, polydimethyl siloxane macromers, methacryloxypropl polyalkyl siloxanes, and mixtures thereof, a silicone hydrogel or a hydrogel, made of monomers containing hydroxyl groups, carboxyl groups, or combinations thereof. Materials for making soft contact lenses are well known and commercially available. Preferably, the material is senofilcon, narafilon, acquafilcon, etafilcon, genfilcon, lenefilcon, balafilcon, or lotrafilcon.

The contact lenses of the present invention may have any of a variety of corrective optical characteristics incorporated into the surfaces in addition to distance and near optical power, such as, for example, cylinder power for the correction of astigmatism, or prism power for the correction of orthoptic or ocular motility problems.

An exemplary contact lens pair that translates sufficiently to enable a wearer to have clear and comfortable vision at far, intermediate and near distances may be fabricated from senofilcon and have a segment height of the near and/or intermediate vision subzone in one lens of about 0.3 mm below the lens center and a segment height of the near and/or intermediate vision subzone in the other lens of about 0.6 mm below the lens center. An exemplary contact lens pair that translates sufficiently to enable a wearer to have clear and comfortable vision at far and near distances may be fabricated from senofilcon and have a rotation of the near vision subzone in one lens of about ten (10) degrees and a rotation of the near vision subzone in the other lens of about twenty-five (25) degrees. Another exemplary contact lens pair that translate sufficiently to enable a wearer to have clear and comfortable vision at far or near distances may be fabricated from senofilcon and have a near vision subzone in one lens with an inset of about one hundred (100) micro meters and a near vision subzone in the other lens of about three-hundred (300) micro meters. It is important to note that any number of combinations for the optical power subzones may be tailored to correct presbyopia.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope for the appended claims.

What is claimed is:

1. A translating contact lens pair for treating presbyopia comprising:
    a first contact lens including an optical zone having at least one distance vision subzone above a horizontal meridian of the first contact lens, at least one near vision subzone below a horizontal meridian of the first contact lens and at least one intermediate vision subzone, a peripheral zone and an edge zone and having a first set of optical zone features with a first set of values for the features, the first set of optical zone features includes segment height, power, asphericity, shape, orientation and inset, the peripheral zone is positioned radially outwards from the optical zone and comprises features that enable lens translation; and
    a second contact lens including an optical zone having at least one distance vision subzone above a horizontal meridian of the second contact lens, at least one near vision subzone below a horizontal meridian of the second contact lens and at least one intermediate vision subzone, a peripheral zone and an edge zone and having a second set of optical zone features with a second set of values for the features, the second set of optical zone features includes segment height, power, asphericity, shape, orientation and inset, wherein at least one of segment height, power, asphericity, shape, orientation and inset in the first set of optical power zone features is different than at least one of segment height, power, asphericity, shape, orientation and inset in the second set of optical power zone features, and wherein the optical zone of each contact lens is asymmetric about the vertical meridian of the contact lens, the peripheral zone is positioned radially outwards from the optical zone and comprises features that enable lens translation, wherein the physical position of the near and intermediate subzones within the optical zone in the first lens is different from the physical position of the near and intermediate zone within the optical zone of the second lens thereby creating an asymmetry of the near and intermediate subzones between the two lenses.

2. The translating contact lens pair according to claim 1, wherein the peripheral zone of each contact lens includes a pseudotrucation design feature on an anterior surface thereof.

3. The translating contact lens pair according to claim 1, wherein the first set of optical zone features comprises a first predetermined segment height and the second set of optical zone features comprises a second predetermined segment height.

4. The translating contact lens pair according to claim 3, wherein the first predetermined segment height ranges from about 0 to about 1 mm and the second predetermined segment height ranges from about 0.4 to about 2 mm.

5. The translating contact lens pair according to claim 3, wherein the first predetermined segment height ranges from about 0 to about 0.6 mm and the second predetermined segment height ranges from about 0.6 to about 1.5 mm.

6. The translating contact lens pair according to claim 1, wherein the first set of optical zone features comprises a first predetermined power and the second set of optical zone features comprises a second predetermined power.

7. The translating contact lens pair according to claim 6, wherein the first predetermined power is about 100 percent power and the second predetermined power is less than about 100 percent power.

8. The translating contact lens pair according to claim 6, wherein the first predetermined power is about 100 percent power and the second predetermined power ranges from about 25 to about 75 percent power.

9. The translating contact lens pair according to claim 6, wherein the first predetermined power is about 100 percent power and the second predetermined power is about 50 percent power.

10. The translating contact lens pair according to claim 6, wherein the first predetermined power is less than about 100 percent power and the second predetermined power is less than about 100 percent power, but not equal to the first predetermined power.

11. The translating contact lens pair according to claim 1, wherein the first set of optical zone features comprises a first predetermined asphericity and the second set of optical zone features comprises a second predetermined asphericity.

12. The translating contact lens pair according to claim 11, wherein the first and second predetermined asphericities have conic constants between about +0.5 and about −1.0.

13. The translating contact lens pair according to claim 1, wherein the first set of optical zone features comprises a first predetermined shape and the second set of optical zone features comprises a second predetermined shape.

14. The translating contact lens pair according to claim 13, wherein the first and second predetermined shapes are identical.

15. The translating contact lens pair according to claim 13, wherein the first and second predetermined shapes are not identical.

16. The translating contact lens pair according to claim 1 wherein the first set of optical zone features comprises a first predetermined orientation and the second set of optical zone features comprises a second predetermined orientation.

17. The translating contact lens pair according to claim 16, wherein the first and second predetermined orientations are identical.

18. The translating contact lens pair according to claim 16, wherein the first and second predetermined orientations are not identical.

19. The translating contact lens pair according to claim 1, wherein the first set of optical zone features comprises a first predetermined inset and the second set of optical zone features comprises a second predetermined inset.

20. The translating contact lens pair according to claim 19, wherein the first predetermined inset ranges from about 0 to about 2 mm and the second predetermined inset ranges from about 0.4 to about 1.5 mm.

21. The translating contact lens pair according to claim 19, wherein the first predetermined inset ranges from about 0.5 to about 1.5 mm and the second predetermined inset ranges from about 1.0 to about 2.0 mm.

* * * * *